US006511844B1

(12) United States Patent
Smith

(10) Patent No.: US 6,511,844 B1
(45) Date of Patent: Jan. 28, 2003

(54) AIR PURIFICATION SYSTEM AND METHOD OF USING THE SAME

(76) Inventor: Michael A. Smith, 4 Burke Rd., Bristol, RI (US) 02809

( * ) Notice: Subject to any disclaimer, the term of this patent is extended or adjusted under 35 U.S.C. 154(b) by 0 days.

(21) Appl. No.: 09/503,043

(22) Filed: Feb. 11, 2000

(51) Int. Cl.[7] .................................................. C12M 1/04

(52) U.S. Cl. .................. 435/299.1; 435/266; 435/300.1

(58) Field of Search ................................. 435/266, 264, 435/289.1, 293.1, 299.1, 300.1; 126/299 E; 422/4, 5, 176, 177; 55/DIG. 36; 96/296, 266, 290

(56) References Cited

U.S. PATENT DOCUMENTS

| | | | | |
|---|---|---|---|---|
| 2,539,344 | A | | 1/1951 | Carraway |
| 3,448,038 | A | * | 6/1969 | Pall et al. |
| 3,563,005 | A | | 2/1971 | Jones |
| 3,616,744 | A | | 11/1971 | Jensen |
| 3,751,885 | A | | 8/1973 | McNeely |
| 4,066,064 | A | | 1/1978 | Vandas |
| 4,235,220 | A | * | 11/1980 | Hepner |
| 4,259,945 | A | | 4/1981 | Lawson |
| 4,351,652 | A | * | 9/1982 | Wisting |
| 4,363,642 | A | | 12/1982 | Stahl |
| 4,753,218 | A | * | 6/1988 | Potter |
| 4,900,341 | A | | 2/1990 | Csabai |
| 5,069,197 | A | | 12/1991 | Wisting |
| 5,077,025 | A | * | 12/1991 | Glass |
| 5,235,963 | A | | 8/1993 | Strause |
| 5,472,342 | A | | 12/1995 | Welsh, II et al. |
| 5,498,376 | A | | 3/1996 | St. Louis et al. |
| 5,503,738 | A | * | 4/1996 | Defilippi et al. |
| 5,860,412 | A | | 1/1999 | Way |
| 5,861,303 | A | * | 1/1999 | Barshter et al. |
| 6,013,512 | A | * | 1/2000 | Turschmid et al. |

FOREIGN PATENT DOCUMENTS

| | | | | |
|---|---|---|---|---|
| AU | B-40316/95 | | * | 3/1999 |
| DE | 33 45 944 | A1 | * | 7/1985 |
| EP | 0 442 110 | A1 | * | 8/1991 |
| EP | 0 874 199 | A2 | * | 10/1998 |
| GB | 2 315 435 | A | * | 2/1998 |
| JP | 52-58068 | A | * | 5/1977 |
| JP | 57-194028 | A | * | 11/1982 |
| JP | 59-98717 | A | * | 6/1984 |
| JP | 61-64316 | A | * | 4/1986 |
| JP | 4-161216 | A | * | 6/1992 |
| JP | 11-57391 | A | * | 3/1999 |

OTHER PUBLICATIONS

LANTEC Sales Publication (No date Provided).

* cited by examiner

*Primary Examiner*—William H. Beisner
(74) *Attorney, Agent, or Firm*—Salter & Michaelson

(57) ABSTRACT

A system and a method for purifying a gaseous contaminated stream are provided. The system and method include a treatment solution that includes at least one non-pathogenic bacteria that digests at least a portion of contaminants contained in the contaminated stream.

38 Claims, 5 Drawing Sheets

AIR PURIFICATION SYSTEM AND METHOD OF USING THE SAME

BACKGROUND

1. Field of the Invention

The present invention is directed to an air purification system and method of use and, in particular, to an air purification system and method of use that involves a treatment solution that contains at least one biological agent.

2. Related Art

Many industrial and commercial operations generate gaseous streams containing chemical contaminants, particulate contaminants, or both. Such gaseous streams may be regulated and, in some instances, require treatment or purification before discharge to the atmosphere.

Generally, contaminated streams are vented through stainless-steel ducts and discharged to the atmosphere. Because the contaminated streams may be flammable, malodorous, or toxic, they are typically vented away from areas in which people work or congregate. In some instances, the stream may be filtered or treated before discharge. Such filtration may remove contaminants, but may not remove offensive odors and may accumulate dangerous and flammable materials. In addition, exhaust ducts may be quite large or bulky, which restricts their placement in many buildings. Thus, the placement of duct work is often restricted or limited by the use or construction of the buildings in which they are placed.

Some types of contaminated streams that require treatment include those from cooking and food preparation, which may be laden with grease, particulate matter, and combinations thereof. Contaminated streams from many industrial operations require treatment as well, for hygienic and regulatory reasons. A significant problem associated with such contaminated streams is the build-up of grease in the treatment system, the venting system, or both. Grease build-up is known to result in offensive odors, vermin infestation, and in some instances, fire. In addition, grease build-up on any surface makes such surfaces very slippery. Thus, when grease build-up is present on a walking surface, accidents to personnel may occur.

U.S. Pat. No. 4,900,341 issued on Feb. 13, 1990, to Csabai, discloses a fume purification system used in conjunction with food cooking equipment.

U.S. Pat. No. 3,616,744 issued on Nov. 2, 1971, to Jensen, discloses an air cleansing system for cooking ranges.

The prior art does not suggest the need for an exhaust system that can be easily moved around or that can be easily moved through or into narrow or confined spaces, such as a compact system, or a modular system.

DEFINITIONS

"Stream" and "contaminated stream," are used interchangeably herein to mean any gaseous stream, from any source, that includes contaminants that are digestible by certain non-pathogenic bacteria. In many instances, such contaminated streams includes a substantial amount of air.

"Contaminant," as used herein, includes, but is not limited to, organic and inorganic chemical contaminants, particulate contaminants, and combinations thereof.

"Waste products," as used herein, means the elimination products that are produced as a result of the chemical transformations occurring in an organism from the time a nutrient substance enters it until it has been utilized and eliminated by the metabolism of contaminants.

"Biological agent," as used herein, includes, but is not limited to, certain non-pathogenic bacterial species.

"Purified stream," as used herein, means the gaseous stream discharged from the system of the invention, from which a substantial amount of contaminants have been removed.

"Substantial," as used herein, means at least 10 percent.

"Non-pathogenic," as used herein, means any bacteria that is not disease causing.

"Treatment solution," as used herein, means a solution that includes at least one non-pathogenic bacteria.

"Digestion," as used herein, refer to the physiological processes involved in the assimilation of nutrients from ingested foods by an animal organism.

"Oleophilic" as used herein means any material that has a high affinity for oil. One example of such a material is polyethylene.

"Lipid" as used herein means any fat, fat-derived material, and combinations thereof. Examples of lipids include fats, oils, grease, and combinations thereof. Such materials typically have molecules having at least 6 carbon atoms.

"Adsorbent" as used herein means a substance which has the ability to condense or hold molecules of other substances on its surface. Activated carbon, activated alumina, and silica gel are examples.

"Modular," as used herein, means constructed in parts that can be assembled and disassembled.

SUMMARY

The present invention is directed to a system and method for purifying contaminated streams. The system of the invention is preferably formed of relatively light-weight and durable materials to allow it to be easily installed and moved from one location to another. In some embodiments, the system is sized and/or configured so as to allow fitment through and into narrow, confined spaces. In other embodiments, the system is sized and/or configured so as to be modular, allowing the system to be transported in a disassembled fashion, assembled at or near the point of installation, and disassembled, if necessary or desired, without destroying the components. Such a system may be transported to other locations for assembly and re-use. Such a system is desirable, for example, in buildings that have limited or narrow access ways into the interior, which is typical in older buildings and urban environments.

The present invention is directed to a system and method for purifying contaminated streams. One embodiment of the invention is directed to a system that includes an inlet for receiving a contaminated stream and an outlet for discharging a purified stream. A chamber is fluidly connected to and disposed between the inlet and the outlet. A source of non-pathogenic bacteria is fluidly connected to the chamber, and a condenser is disposed between the chamber and the outlet.

Another embodiment of the invention is directed to an air purification system having an inlet at an inlet end for receiving a contaminated stream and an outlet at an outlet end for discharging a purified stream. A chamber is fluidly connected to and disposed between the inlet and the outlet. The chamber further includes an adsorbent filtration media, a source of non-pathogenic bacteria, and a source of alkalinity. A first plurality of misters is disposed within the chamber above the filtration media and fluidly connected to the source of non-pathogenic bacteria and to the source of alkalinity. A condenser is fluidly connected downstream of the chamber and upstream of the outlet.

Another aspect of the invention is directed to a method of purifying a contaminated gas. A continuous gaseous stream and a treatment solution that includes a biological agent are provided. The contaminated stream is purified by treating the contaminated stream with the treatment solution to substantially remove the contaminants therefrom. The purified gas is discharged to the atmosphere.

DETAILED DESCRIPTION

Figure 1:
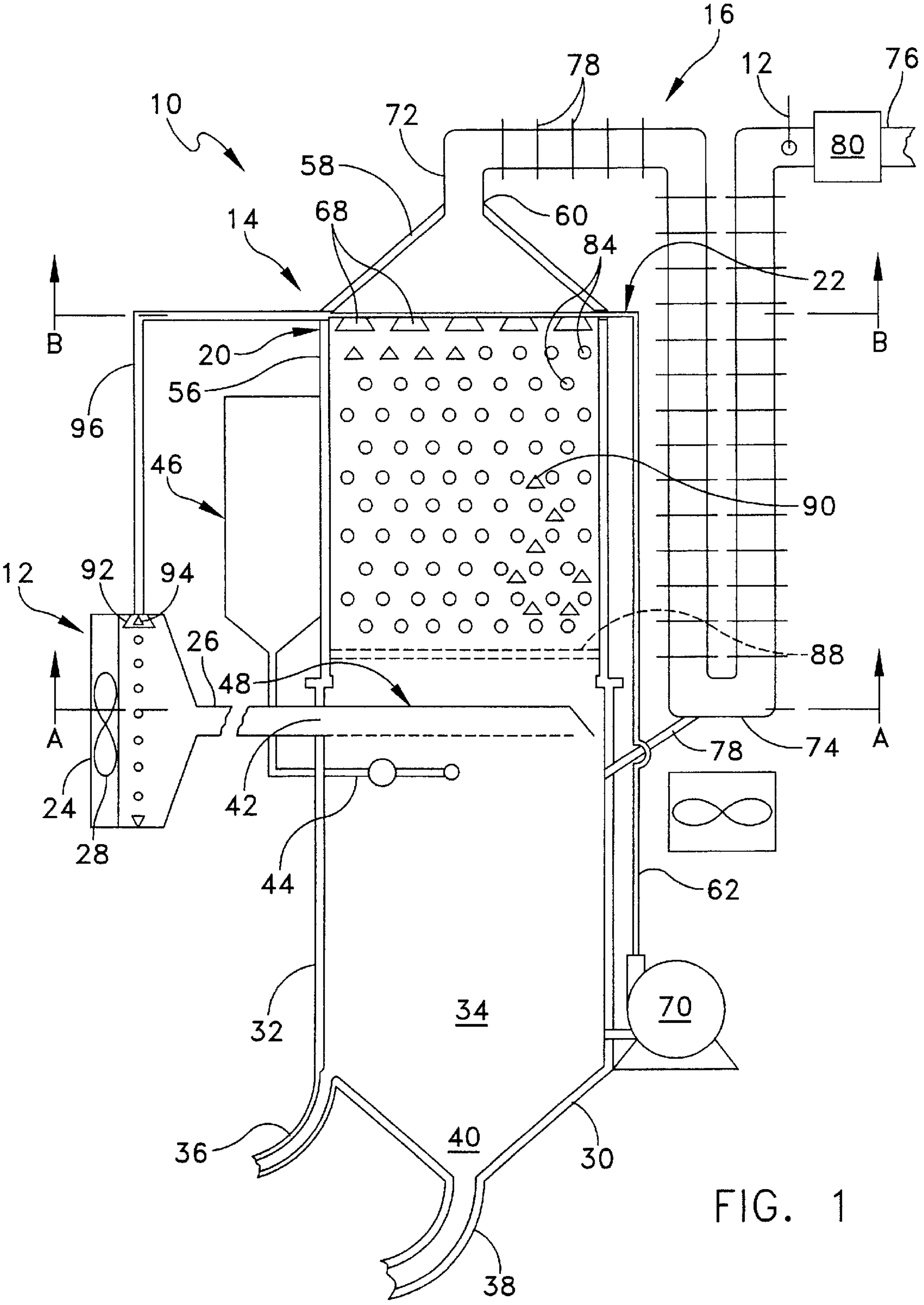
FIG. 1 is a schematic illustration of one embodiment of an air purification system according to the invention.

The present invention is directed to a system and method for purifying contaminated streams. The method involves treating the contaminated streams with a treatment solution to digest at least a portion of the contaminants contained in the stream and to provide a purified stream. In preferred embodiments, the method additionally involves treating the contaminated stream with an alkaline treatment solution to at least partially saponify any long-chain carbon molecules contained in the stream.

Advantages of the system and method of the invention include the ability to remove dangerous, odoriferous, and unsightly contaminants, including grease, from surfaces including, but not limited to, duct-work, walls, floors, and ceilings. Moreover, the removal of grease reduces the danger of fire, slippage, accidents, odor complaints, and vermin infestation, with subsequent economic advantage. Thus, the system and method of the invention are particularly well-suited for treating contaminated streams generated in cooking, food preparation, and industrial operations.

The system may be located directly or indirectly from the source of contamination. The system allows the discharge of a purified stream anywhere, at any distance from the source of contamination. Thus, unlike other systems, the system of the present invention may be located anywhere in a facility, which maximizes property use and value. In addition, the variety of locations at which the system may be located and operated enhance aesthetic considerations in the design of buildings.

In some embodiments, the system may be constructed and arranged in modules, which provides the advantage of ease of installation and removal in a variety of buildings, particularly in the interior of such buildings. The entire system may be packaged inside a plastic or metal covering. Depending on flow rate requirements, the system may be manufactured in several sizes, and may be mounted on the floor, a wall, from a ceiling support, on a roof, or outside. In addition, one system may service several sources of contamination by adding multiple intake ducts.

The system is unique as it offers accessibility as well as ease of maintenance and operation. Because the system can be located anywhere in a facility's floor plan without regard to HVAC considerations, the location of the system can improve real estate value and maximize manufacturing/operational savings. Other benefits of the system include greatly improved fire safety, improved employee health and safety (i.e., relief from slippage, vermin infestation, decomposition products), odor control (discharged air is cool and free of grease and odor), improved public relations (sight, odor, and safety), visual improvements (no unsightly grease buildup near vents), regulatory agency relief (OSHA, EPA, fire department, local safety, health and environmental agencies), and insurance advantages relative to fire safety and other considerations.

Areas in which the system may be installed and used include (but are not limited to) restaurants, food service and processing operations, cooking operations in trailers (commercial and residential), home kitchens and barbecues, manufacturing operations, shipboard operations (galley, engine room, fueling operations, bunker and bilge exhaust management), heating flues and chimneys, oil loading or transfer operations, management of any organic molecules in vapor phase amenable to bacterial degradation, and as an adjunct to cleaning grease contaminated filters or other oily materials.

The treatment solution used in the method and system of the invention contains at least one non-pathogenic bacteria. The bacteria contained in the treatment solution digests at least a portion of the contaminants contained in the stream.

The formulation of the treatment solution may be tailored to the contaminated stream by selecting a bacteria that will digest the particular waste contained in the stream. In a preferred embodiment, the treatment solution includes a saprophytic bacteria, which aids in the digestion of long-chain carbon molecules. Suitable bacteria include, but are not limited to, non-pathogenic saprophytic bacterial species such as bacillus subtilis. In a preferred embodiment, in which a saprophytic bacteria is included in the treatment solution and the contaminated stream includes long-chain carbon molecules, the bacteria metabolize long-chain carbon molecules as an energy source. Such long-chain carbon molecules are found in a variety of commercial and industrial sources, and are founds in fats, oils, grease, and combinations thereof. The metabolic products, or by-products of the digestion of long-chain carbon molecules include carbon dioxide, water, and in some instances, fatty acid molecules. The by-products are harmless and odorless. Thus, discharge of the by-products may be performed anywhere.

In a preferred embodiment, the treatment solution is weakly acidic or alkaline, which aids in the saponification of long-chain carbon molecules. In the present embodiment, the pH of the treatment solution is preferably in the range of about 6.5 to about 9.5, more preferably between about 6.5 to about 8.5, and most preferably between about 6.8 to about 7.5. The pH may also be selected and adjusted to enhance biological activity of the bacteria included in the treatment solution by adding a source of alkalinity. Suitable sources of alkalinity include, but are not limited to, sodium hydroxide and the like.

Other additives may be included in the treatment solution, or added separately to the system to enhance digestion and saponification. The treatment solution may also include other compounds such as enzymes, detergents, tensides, or other surface active agents. In addition, the treatment solution may include catalysts and micro-nutrients to support the bacteria.

Figure 2:
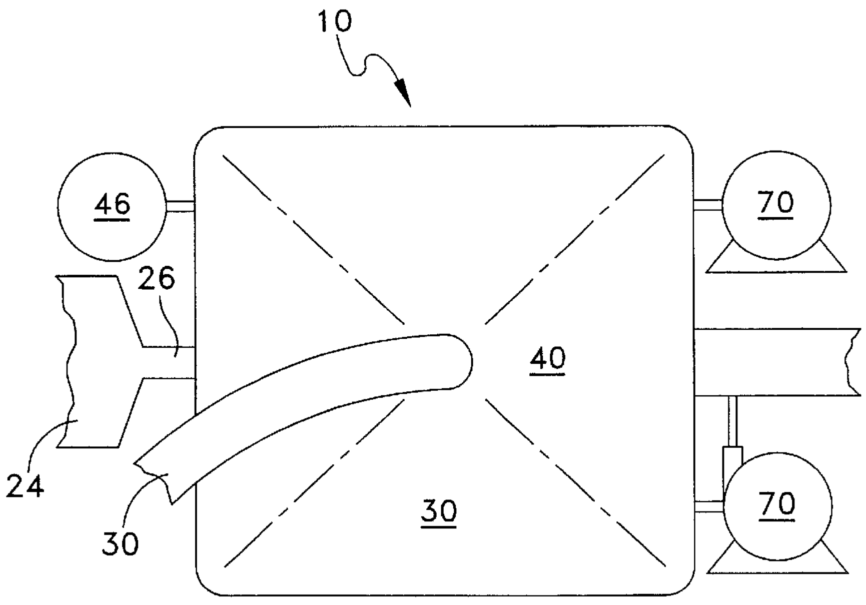
FIG. 2 is a bottom view of the system of FIG. 1.

One embodiment of a system 10 according to the present invention is illustrated schematically in side view in FIG. 1 and in bottom view in FIG. 2. System 10 includes an intake assembly 12, a bioreaction chamber 14, and a condenser assembly 16, which are all fluidly connected. System 10 also includes at least one misting assembly 22, which is described in greater detail below. Bioreaction chamber 14 is defined by a lower section 18 and an upper section 20, which may be modular or integrally formed.

As shown in the bottom view in FIG. 2, system 10 is illustrated herein as substantially square, but those of skill in the art will recognize that it may have any shape, such as, for example, rectangular or cylindrical. In addition, system 10 may have any size, limited only by practical considerations. System 10 is preferably operated by a programmable logic controller (PLC) (not illustrated), for controlling the electrical devices of the system, some of which are described below, including, but not limited to pumps, fans, valves, warning lights for high temperature and low solution level, and system on-off signals, which are conventional and known to those of skill in the art.

Intake assembly 12 is constructed and arranged to receive a contaminated stream and to distribute the contaminated stream into lower section 18. Intake assembly 12 includes an intake duct 24 and a conduit 26, which are fluidly connected to each other and to lower section 18. In one embodiment, the intake duct 24 and conduit 26 are an integral unit. In another embodiment, the intake duct 24 and conduit 26 are separate pieces that are fitted to each other and to lower section 18, for example, by friction fitting or welding. In a preferred embodiment, the intake assembly 12 may include an intake fan 28 disposed in the inlet duct 24, which facilitates transport of the contaminated stream into conduit 26. Although preferred, those of skill in the art will recognize that the intake fan is not necessary to the practice of the invention.

Also in preferred embodiments, intake assembly 12 may include an air distribution manifold 48, described in greater detail below, which provides relatively increased distribution of the contaminated stream into the bioreaction chamber 14, and increases the contact of the contaminated stream with the treatment solution. Again, although preferred, those of skill in the art will recognize that the distribution manifold is not necessary to the practice of the invention.

Lower section 44 includes a bottom wall 30 and a side wall 32, and is constructed and arranged to define a reservoir 34 for a containing the treatment solution described above. A circulating pump 70 is connected to the reservoir 34 and the misting assembly 22. Side wall 32 of lower section 14 includes an aperture 42 defined by conduit 26, which is fluidly connected thereto. A liquid level float valve 44 is preferably disposed within the reservoir 34 below aperture 42. A replenishment tank 46 is fluidly connected to the reservoir 34 which, in combination with liquid level float valve 44, is used to maintain an appropriate level of treatment solution within the reservoir 34. The treatment solution may be maintained at any level below the aperture 42 to prevent the solution from backing up into the intake assembly. The treatment solution may additionally include a source of alkalinity or, alternatively, the system may include a separate source of alkalinity that is separately introduced to the bioreaction chamber.

As seen in FIG. 2, bottom wall 30 may include a treatment solution drain 36 to allow the replacement or drainage of a portion of the treatment solution. A sludge drain 38 may be included in bottom wall 30 as well, allowing periodic removal of accumulated particulate or sludge. To assist in the collection and removal of sludge from the reservoir, bottom wall 30 is preferably downwardly pitched, which assists in the accumulation of particulate in the lowermost portion 40 of reservoir 34.

Figure 3:
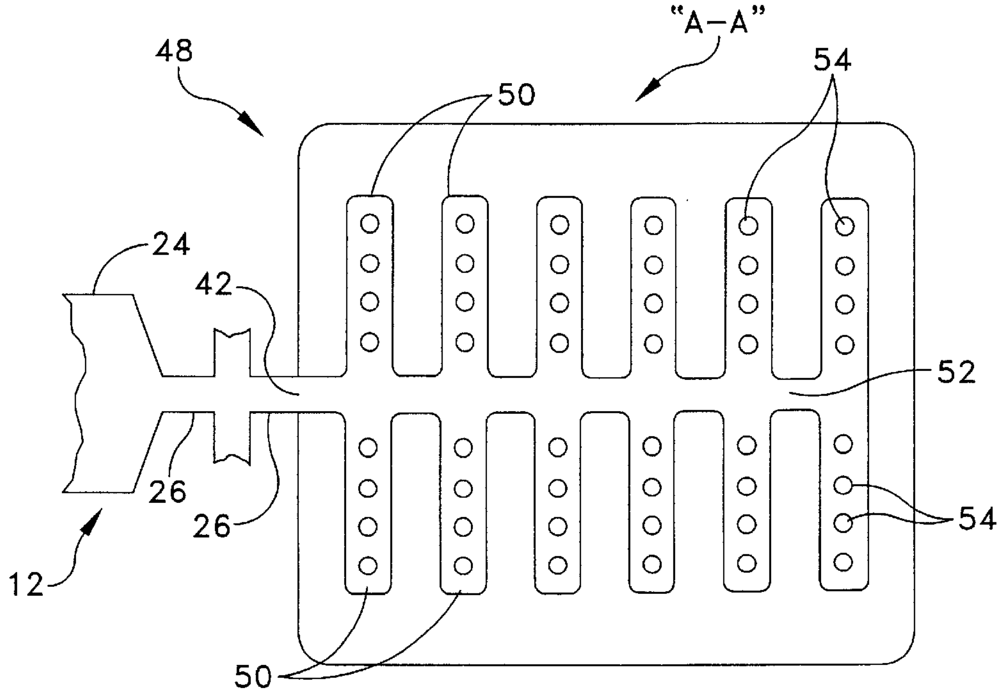
FIG. 3 is a cross-sectional illustration of the air purification system of FIG. 1 along plane "A—A," showing the distribution manifold.

FIG. 3 is a top view of distribution manifold 48 through plane A—A of FIG. 1. Distribution manifold 48 may be disposed within reservoir 34 and is preferably fluidly connected to conduit 26 at aperture 42. In some embodiments, distribution manifold may be integrally formed with the intake assembly 12. Distribution manifold 48 preferably includes a plurality of distributors 50 extending perpendicularly from a center conduit 52. Each distributor 50 preferably includes a plurality of apertures 54 disposed at periodic intervals for introducing the contaminated stream into the bioreaction chamber 14.

Referring again to FIG. 1, upper section 20 has substantially the same cross-sectional shape as lower section 18. Therefore, in the present embodiment, upper chamber 20 is shown as substantially square, and includes a side wall 56 and a top wall 58. In preferred embodiments, upper section 20 may be packed with a packing material 84 in order to increase the available surface area within bioreaction chamber 14, which maximizes the capabilities of the system. Different sizes and types of packing material 84 may be combined, and additional materials may be included, as described below. A screen 88 may be included in upper section 20 to prevent packing material 84 from accumulating in lower chamber 18.

Packing material 84 may be positioned in upper section 20 in many different arrangements, some of which are described below. For example, packing material 84 may be loosely packed, and various diameters and shapes may be used in order to maximize air flow characteristics within bioreaction chamber 14.

Figure 4:
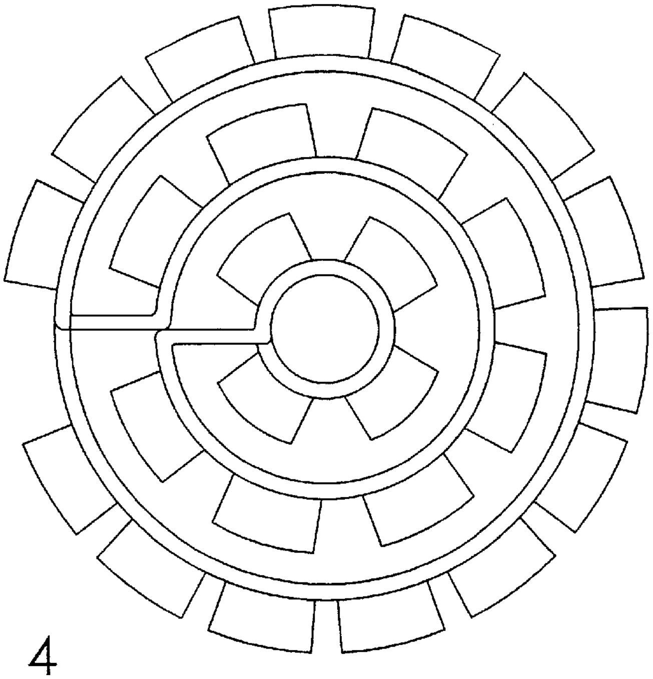
FIG. 4 is a cross section of a preferred packing material of the air purification system of FIG. 1.

Preferably, packing material 84 has a relatively high surface area to volume ratio. In addition, packing material 84 is preferably an oleophilic material, which maximizes the surface area to which the contaminants, especially oil, grease, and fat, may adhere. Preferably, the surface area characteristics of the packing material 54 allow the development and support of lush biological lawns, which further enhance the oil and grease digesting ability of the system, and increases the retention time of the contaminated stream therein. Suitable materials for the packing material 84 include any oleophilic material or combinations of oleophilic materials. Polyethylene (PE), which is available in a variety of shapes and sizes, is a preferred material. For example, PE is available in tubular form, and in pelletized form, in which the pellets have teardrop, triangular, and spherical shapes. In a preferred embodiment, upper section 14 is packed with spherical PE pellets having a diameter ranging from about 0.5 cm to about 4 cm. In a particularly preferred embodiment, the upper section is packed with the PE packing balls 86 shown in FIG. 4 and described in U.S. Pat. No. 5,498,376.

Alternatively, upper chamber 14 may include a filtration media 90 which acts as a polish to pick up residual organic material in the air. Similarly to the packing material 54, it is preferred that the surface area characteristics of the filtration media 90 allow the development and support of lush biological lawns, to enhance the oil and grease digesting ability of the system and increase the retention time of the contaminated stream therein. Preferably, filtration media 90 is adsorbent and non-reactive with the treatment solution. Suitable materials for filtration media 90 include adsorbent materials such as granular activated carbon (GAC), which is preferred because of its surface characteristics which are useful for maintaining biological activity.

In another embodiment, upper chamber 20 may include a packing material 54 and a filtration media 90, in any combination. A preferred combination includes packing balls 86 interspersed with GAC. In another preferred combination, the GAC is secured in fine mesh plastic bags and inserted into the packing balls 86.

Figure 5:
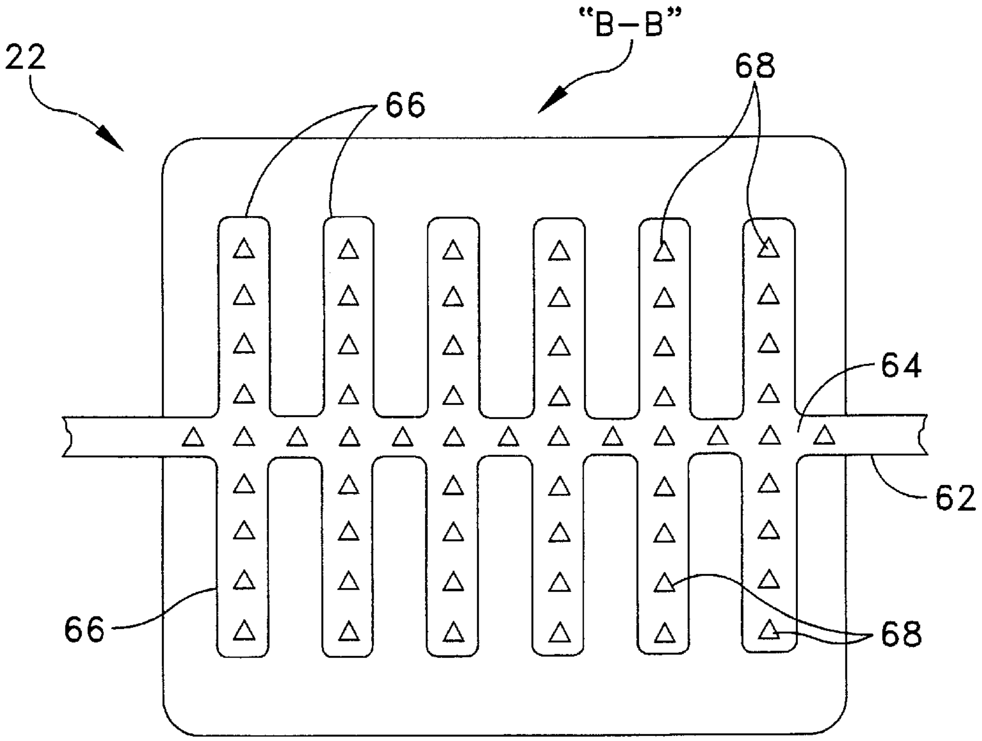
FIG. 5 is a cross section showing the primary misting system of the air purification system of FIG. 1.

A cross-section of a preferred misting assembly 22 is shown in FIG. 5. Misting assembly 22 is fluidly connected to reservoir 34 by a feed line 62. Misting assembly 22 includes distribution conduit 64 from which a plurality of distributors 66 extend, for distributing the treatment solution into the bioreaction chamber 20. Each distributor 66 preferably includes a plurality of misting outlets 68 disposed at periodic intervals for introducing the contaminated stream into the bioreaction chamber 14. In preferred embodiments, the misting assembly 22 includes a plurality of such misting outlets 68, as discussed below with reference to the next embodiment. The circulating pump 70 is connected to the reservoir 34 and the misting assembly 22 to urge the treatment solution upwardly through the feed line 62 to distribution conduit 64. Misting assembly 22 is constructed and arranged to receive a liquid solution and to dispense a fine mist of droplets. Those of skill in the art will recognize that misting assembly 22 may be positioned anywhere within the bioreaction chamber 14 that is above the level of treatment solution within the reservoir 34. However, it is preferred that the outlet is positioned in the upper section 20.

Additional misting assemblies that are substantially similar to the one previously described may be included at other locations within the system. For example, misting assembly 92 is included in intake duct 24, and is fluidly connected to the treatment solution replenishment chamber 46 via line 96. As in the primary misting assembly 22, a plurality of inlets 94 may be included therein.

Condenser assembly 18 is fluidly connected to the upper chamber 20, preferably at an aperture 60 of bioreaction chamber 14. Any type of assembly that allows condensation and collection of the treatment solution may be used in the present system, many of which are known to those of skill in the art. Condenser assembly 18 includes an inlet end 72, a condensate collection portion 74, and a purified stream outlet 76. A condensed solution treatment return 78 fluidly connects the condensate collection portion 74 of condensing assembly 18 to reservoir 34. A condenser trap drain (not illustrated) may also be included at the collection portion 74 of the condenser 18 to allow drainage of accumulated sludge, residue, waste products, or any combination thereof, that does not evaporate to allow discharge to the atmosphere through the purified stream outlet 76. The condenser assembly illustrated in FIG. 1 is pipe bent into a suitable configuration in order to allow collection of the treatment solution at the lowest portion of the pipe condenser assembly. Suitable materials for the piping include, but are not limited to, stainless steel and plastic.

In preferred embodiments, condenser assembly 18 may also include a plurality of fins 78. The use of such fins are optional, but are desirable due to the increased rate of condensation of treatment solution and enhanced cooling of purified air that is provided by their use. An optional cooling fan (not illustrated) may be utilized to assist heat dissipation from condenser.

Also according to any of the embodiments disclosed herein, a filter 80 may optionally be provided in condenser 18, to aid in the removal of any remaining particulate material that was not removed or digested in the bioreaction chamber 14. In addition, a temperature gauge 82 for monitoring the temperature of the purified air prior to discharge may be included. Although shown upstream of the optional filter 80, those of skill in the art will recognize that the temperature gauge 82 may be positioned elsewhere, including downstream of the optional filter.

Figure 6:
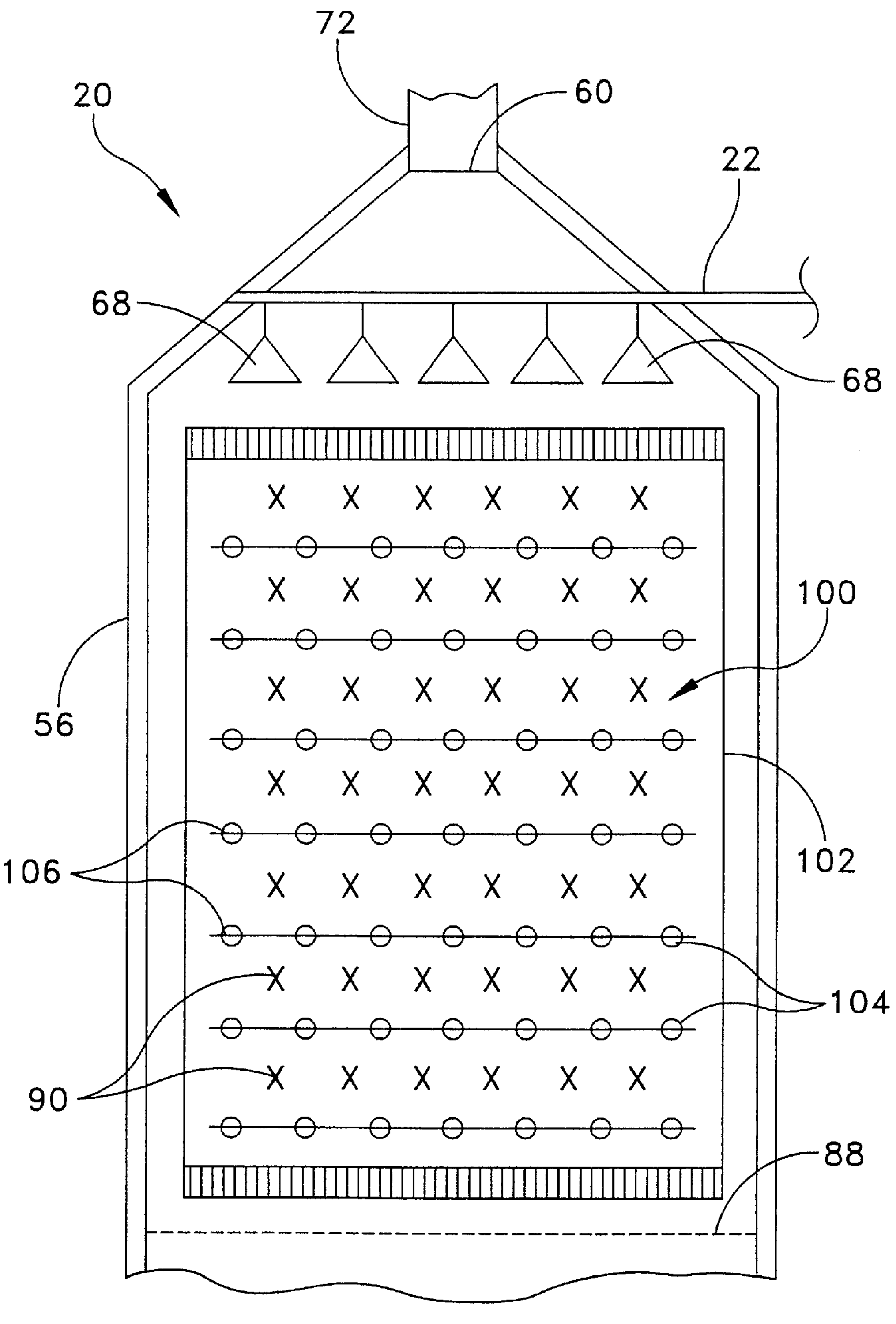
FIG. 6 is a cross section of the replaceable cartridge of the air purification system of FIG. 1.

In a preferred embodiment, at least one replaceable cartridge 100, as shown in FIG. 6, may be disposed in the upper section 20 below misting system 22. Cartridge 100 preferably has an exterior edge 102 that substantially conforms to the shape of the upper section 20. Cartridge 100 is preferably disposed above screen 88. Cartridge 100 is preferably formed from a material that has a high affinity for oil, such as, for example, PE. Those of skill in the art will recognize that the structure, arrangement, composition, and size of cartridge 100 may be tailored to the specific needs of the system. Cartridge 100 is designed to be easily replaceable for purposes of cleaning, repair, replacement, or reorganization of the modular units. Depending upon the size of the system, upper section 20 may include a plurality of cartridges 100.

In another embodiment, cartridge 100 may be filled with packing material 84, filtration media 90, or combinations thereof. Preferred materials for packing material 84 and filtration media 90 are the same as those previously described. Packing material 84 and filtration media 90 may be positioned within cartridge 100 in many different arrangements. In addition, different sizes or types of material may be used together. For example, the materials may be loosely packed, and various diameters and shapes may be used in order to maximize air flow characteristics within the cartridge. One preferred embodiment includes spherical PE pellets having a diameter ranging from about 0.5 cm to about 4 cm.

In one preferred embodiment illustrated in FIG. 5, cartridge 100 includes a plurality of rods 104 on which PE packing balls are arranged in tiers 106. In a preferred embodiment, each tier 106 is disposed at a 90 degree orientation with respect to adjacent tiers. Cartridges 100 may be arranged vertically or stacked horizontally in upper chamber 20 to form horizontal or vertical layers. In addition, the material from which each tier 106 formed may alternated to maximize capture, adsorption, and digestion of the contaminants.

In another embodiment, cartridge 100 may include at least one spacing member (not illustrated), which allows the formation of compartments within the cartridge. The spacing members may be disposed vertically or horizontally to form horizontal or vertical compartments. The spacing members are also preferably formed from a material that has a high affinity for oil, as described above. One preferred material is PE, which is available as, for example, continuous or perforated sheets, such as grids.

In another embodiment, cartridge 100 may include a filtration media, such as filtration media 90 described above.

In other embodiments, cartridge 100 may include both a packing material 84 and a filtration media 90 in any combination. One embodiment includes PE balls interspersed with GAC. Filtration media 90 may be introduced into the cartridge, or inside the packing balls, preferably secured in fine mesh plastic bags.

Figure 7:
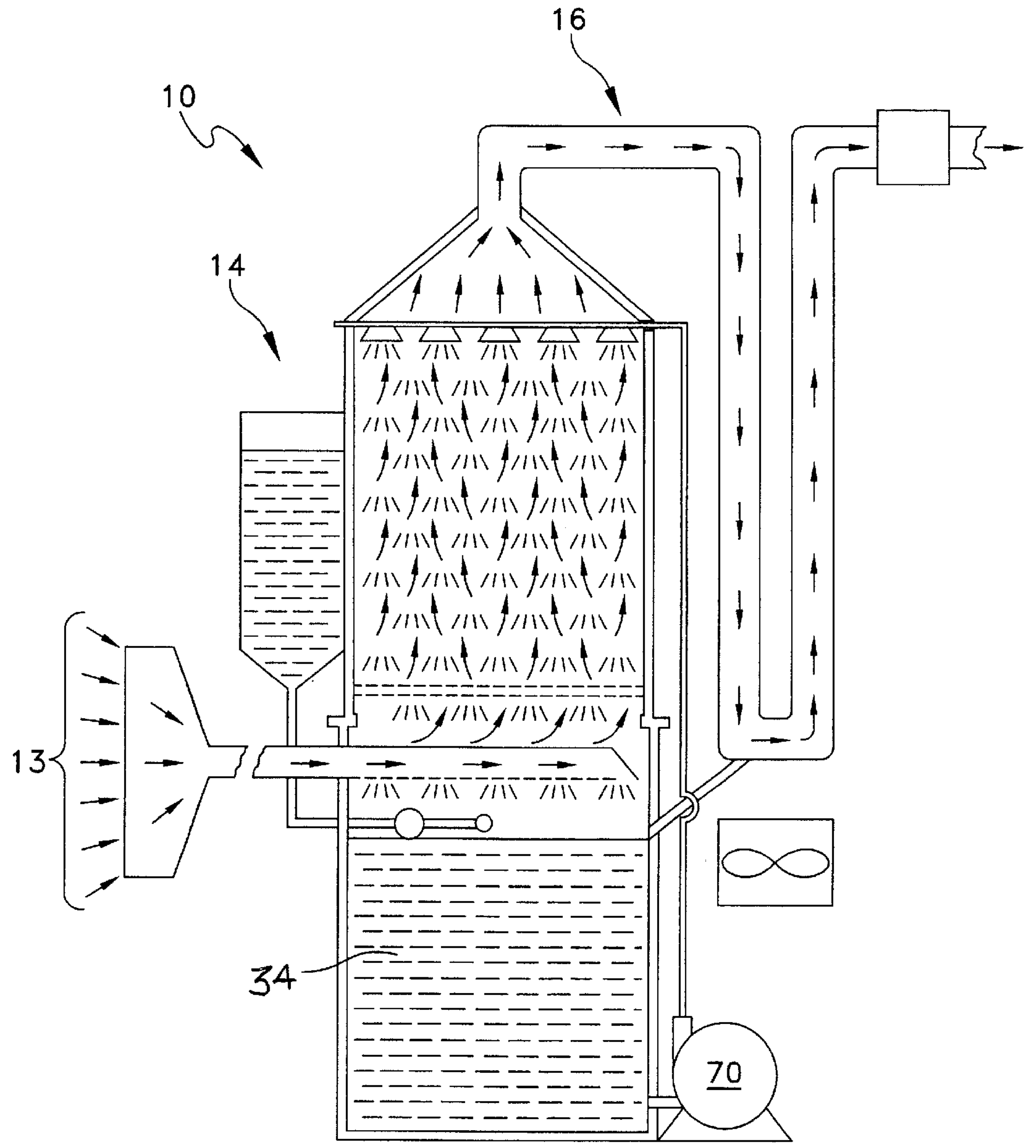
FIG. 7 is a schematic illustration of the flow pattern of the contaminated stream and treatment solution according to the method of the invention.

A method of practicing the invention will now be described with reference to FIG. 7. The method of the invention involves treating a contaminated stream with a treatment solution that includes at least one non-pathogenic bacteria.

A preferred method of practicing the invention is illustrated with reference to FIG. 7, in which the arrows represent the flow of the contaminated stream in the system. According to the method, a contaminated stream 13 is drawn into the lower section 18 through intake assembly 12. A treatment solution 35 is disposed in reservoir 34. The stream 13 may be from any number of processes, including, but not limited to, cooking exhaust, food preparation exhausts, and industrial processes and exhausts. In a preferred embodiment, the method involves introducing the contaminated stream 13 into reservoir 34 through the air distribution manifold 48. The contaminated stream 13 is allowed to rise upwardly through reservoir 34 and into upper section 14. In some instances, the temperature of the contaminated stream 13 may be elevated to as much as about 140° C., depending on the source.

In the bioreaction chamber 20, the treatment solution 35 is pumped from the solution reservoir 34 by the circulating pump 70. The treatment solution 35 is introduced into the upper section 14 by misting assembly 22. Preferably, the treatment solution 35 is introduced as a relatively fine mist. Those of skill in the art will recognize that the treatment solution 35 may be introduced to the system at any point after the intake duct 24 and before the condenser inlet 72, but it is preferred that it is introduced directly into the bioreaction chamber 20. Thus, the droplets or mist of treatment solution 35 directly contact the contaminated stream 13, allowing the bacteria contained in the treatment solution to digest the digestible contaminants and, if a caustic solution is used, allowing the caustic solution to saponify at least a portion of the contaminants.

If the system includes an adsorbable filtration medium, then adsorbable contaminants contained within the contaminated stream may be adsorbed onto the adsorbent medium. There, the contaminants may be acted upon by the treatment solution while they are adsorbed onto the filtration medium. In this manner, the adsorption media increases the residence time of the contaminated stream in the bioreaction chamber. Typical adsorbable contaminants include, but are not limited to, long-chain carbon molecules such as grease, oils, fats, and combinations thereof. Constant circulation of the treatment solution over the packing material and filtration media will result in total biological degradation of the fats, oils, or greases. A small amount of sludge may result from the digestion process, which is easily removed from the sludge removal drain.

As the contaminated stream flows through the system toward the condenser inlet, treatment solution flows with the stream, keeping the passage free of grease buildup. The treated stream flows through the bioreaction chamber chamber and into the condensing assembly, where it is further cooled. As the treatment solution and air are cooled, the treatment solution condenses. The condensate is collected in the condensate collection portion of the condensing assembly, from which it may be returned to the reservoir via the condensate return. Optional fins on the condensing tubes and a fan may provide further cooling if necessary. After the treatment solution has condensed, a purified stream flows through the condenser toward the condenser outlet. In some instances, it may be desirable to allow the purified stream to pass through an optional filter to remove non-condensible gases or particulate material that was not removed in the bioreaction chamber. A cool, purified stream is then discharged from the condenser outlet. The outlet may discharged directly to the atmosphere, or may be connected to further duct-work before reaching the atmosphere.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An air purification system, comprising:

an inlet for receiving a contaminated stream;

an outlet for discharging a purified stream;

a chamber fluidly connected to and disposed between the inlet assembly and the outlet, the chamber including a bioreaction chanber and a reservoir, the bioreaction chamber being disposed above the reservoir;

a source of non-pathogenic bacteria fluidly connected to the reservoir;

a first misting assembly positioned in the bioreaction chamber and being fluidly connected to the reservoir;

an air distribution manifold positioned within the chamber substantially between the bioreaction chamber and the reservoir, the air distribution manifold including a central conduit from which aplurality of distributors extend perpendicularly, each distributor including a plurality of apertures; and a condenser disposed between the chamber and the outlet for cooling the purified stream and for collecting treatment solution.

2. The system of claim 1, further comprising a source of an alkaline solution fluidly connected to the chamber.

3. The system of claim 1, wherein the system can be disassembled and reassembled.

4. The system of claim 3, wherein the system is constructed for use as a kitchen exhaust system.

5. The system of claim 1, wherein the system is constructed for use as a kitchen exhaust system.

6. The system of claim 1, wherein the inlet assembly further includes a plurality of inlets for receiving a plurality of contaminated streams.

7. The system of claim 1, further comprising a second misting assembly positioned upstream of the first misting asseembly.

8. The system of claim 7, wherein the second misting assembly is positioned within the inlet assembly.

9. The system of claim 7, wherein the second misting assembly is positioned in the bioreaction chamber.

10. The system of claim 7, wherein the second misting assembly includes a distribution conduit from which a plurality of distributors extend, each of the distributors including a plurality of misting outlets.

11. The system of claim 1, wherein the chamber is divided by a screen positioned above the reservoir.

12. The system of claim 11, wherein the chamber further includes a material supported on the screen positioned above the reservoir, the material being selected from the group consisting of a filtration media, a packing material, or combinations thereof.

13. The system of claim 12, wherein the material is selected from the group consisting of polypropylene, other oleophilic material, granular activated carbon, and combinations thereof.

14. The system of claim 12, wherein the filtration media comprises granular activated carbon.

15. The system of claim 12, wherein the material is a packing material, and the packing material comprises packing balls.

16. The system of claim 15, wherein the packing balls contain granular activated carbon.

17. The system of claim 11, further comprising at least one replaceable filtration cartridge positioned above the screen.

18. The system of claim 17, wherein at least one replaceable filtration cartridge contains a packing material, a filtration media, or combinations thereof.

19. The system of claim 18, wherein the at least one replaceable filtration cartridge is constructed of polyethylene.

20. The system of claim 18, wherein the packing material is spherical polyethylene pellets.

21. The system of claim 20, wherein the pellets have a diameter ranging from about 0.5 cm to about 4 cm.

22. The system of claim 17, wherein the at least one replaceable cartridge includes a plurality of rods on which polyethylene balls are arranged in tiers.

23. The system of claim 22, wherein each tier is disposed at a 90 degree angle to an adjacent tier.

24. The system of claim 17, wherein the at least one replaceable cartridge further includes at least two compartments defined by a spacing member.

25. The system of claim 17, wherein the at least one replaceable cartridge is positioned above and parallel to the screen.

26. The system of claim 17, wherein the at least one replaceable cartidge is positioned above and perpendicular to the screen.

27. The system of claim 1, wherein the first misting assembly includes a distribution conduit from which a plurality of distributors extend, each of the distributors including a plurality of misting outlets.

28. An air purification system, comprising:

an inlet at an inlet end for receiving a contaminated stream;

an outlet at an outlet end for discharging a purified stream;

a chamber fluidly connected to and disposed between the inlet and the outlet, the chamber including an upper, bioreaction section and a lower, reservoir section, the chamber further including a screen positioned above the reservoir section and a packing material supported on the screen;

a source of non-pathogenic bacteria;

a source of alkalinity;

a first misting assembly disposed within the chamber above the packing material and fluidly connected to the source of non-pathogenic bacteria and to the source of alkalinity;

a second misting assembly fluidly connected to the reservoir and disposed upstream of the first plurality of misters; and a condenser fluidly connected downstream of the chamber and upstream of the outlet for cooling the purified stream prior to being discharged from the system;

wherein the first and second misting assemblies each includes a distribution conduit from which a plurality of distributors extend, each of the distributors including a plurality of misting outlets.

29. The system of claim 28, wherein the packing material is selected from the group consisting of a packing material, a filtration media, or combinations thereof.

30. The system of claim 28, wherein the source of alkalinity is selected from the group consisting of saponifying, reactive, digestive materials, and combinations thereof.

31. The system of claim 30, further comprising a saprophytic biological agent.

32. The system of claim 28, further comprising a contaminated stream inlet fluidly connected to the chamber.

33. The system of claim 32, further comprising an air distribution manifold disposed within the chamber and fluidly connected to the contaminated stream inlet.

34. The system of claim 33, wherein the air distribution manifold includes a central conduit from which a plurality of distributors extend perpendicularly, each distributor including a plurality of apertures.

35. The system of claim 28, wherein the system is constructed and arranged to be disassembled and reassembled.

36. The system of claim 35, wherein the system is operative for use as a kitchen exhaust system.

37. The system of claim 28, wherein the system is operative for use as a kitchen exhaust system.

38. The system of claim 28, wherein the second misting assembly is positioned in the inlet assembly.

* * * * *